United States Patent
Rappitsch et al.

(10) Patent No.: US 10,780,981 B2
(45) Date of Patent: Sep. 22, 2020

(54) AIRCRAFT SEAT RAIL MOUNTING MEMBER

(71) Applicant: AIRBUS OPERATIONS GMBH, Hamburg (DE)

(72) Inventors: Michael Rappitsch, Taufkirchen (DE); Konrad Rauch, Augsburg (DE); Manfred Haug, Hamburg (DE); Ralf Woerdemann, Taufkirchen (DE)

(73) Assignee: Airbus Operations GmbH, Hamburg (DE)

( * ) Notice: Subject to any disclaimer, the term of this patent is extended or adjusted under 35 U.S.C. 154(b) by 448 days.

(21) Appl. No.: 15/644,090

(22) Filed: Jul. 7, 2017

(65) Prior Publication Data
US 2018/0009535 A1 Jan. 11, 2018

(30) Foreign Application Priority Data
Jul. 7, 2016 (EP) .................................... 16178466

(51) Int. Cl.
*B64D 11/06* (2006.01)
*F16L 3/12* (2006.01)
*H02G 3/04* (2006.01)

(52) U.S. Cl.
CPC ...... *B64D 11/0696* (2013.01); *B64D 11/0698* (2014.12); *F16L 3/1222* (2013.01); *B64D 11/0624* (2014.12); *H02G 3/0456* (2013.01)

(58) Field of Classification Search
CPC ............ B64D 11/0696; B64D 11/0698; B64D 11/0624; F16L 3/1222; H02G 3/0456
See application file for complete search history.

(56) References Cited

U.S. PATENT DOCUMENTS

| 6,517,028 | B2 * | 2/2003 | Huber | B64D 9/00 244/118.1 |
| 8,550,564 | B1 * | 10/2013 | Kismarton | B64D 11/06 297/216.1 |
| 2004/0212228 | A1 * | 10/2004 | Skelly | B64D 11/06 297/217.3 |

(Continued)

FOREIGN PATENT DOCUMENTS

WO   WO 02/18204 A2   3/2002

OTHER PUBLICATIONS

European Patent Office Action for Application No. 16178466 dated Apr. 16, 2018.

(Continued)

*Primary Examiner* — Assres H Woldemaryam
(74) *Attorney, Agent, or Firm* — Jenkins, Wilson, Taylor & Hunt, P.A.

(57) ABSTRACT

An aircraft assembly with first and second seat rails for interlocking with an aircraft seat, and a systems component mounting member interlocked with those seat rails. The mounting member has a first anchor member interlocked with the first seat rail and a second anchor member interlocked with the second seat rail. The assembly includes an aircraft systems component mounted on the mounting member. Existing seat rails or tracks of the aircraft can be used for attachment of support brackets for aircraft systems components. A novel way of using existing seat rails to provide anchorage points for systems brackets for systems components is disclosed.

19 Claims, 5 Drawing Sheets

(56) References Cited

U.S. PATENT DOCUMENTS

| | | | |
|---|---|---|---|
| 2006/0124821 A1* | 6/2006 | McFarlane | B64D 11/0696 |
| | | | 248/429 |
| 2007/0267543 A1* | 11/2007 | Boren | B60N 2/995 |
| | | | 244/118.5 |
| 2008/0150342 A1* | 6/2008 | Kismarton | B64D 11/06 |
| | | | 297/452.18 |
| 2008/0290242 A1* | 11/2008 | Kismarton | A47C 5/00 |
| | | | 248/503.1 |
| 2009/0084925 A1* | 4/2009 | Kismarton | A47C 5/00 |
| | | | 248/503.1 |
| 2009/0126966 A1 | 5/2009 | Flaig et al. | |
| 2015/0225083 A1* | 8/2015 | Gutenkunst | B64D 9/003 |
| | | | 244/137.1 |
| 2017/0021933 A1* | 1/2017 | Pozzi | B64D 11/0636 |
| 2017/0274975 A1* | 9/2017 | Bobaru | B64C 1/1469 |

OTHER PUBLICATIONS

Extended European Search Report for Application No. 16178466 dated Nov. 7, 2016.

* cited by examiner

AIRCRAFT SEAT RAIL MOUNTING MEMBER

CROSS-REFERENCE TO RELATED APPLICATION

This application claims priority to European Patent Application EP 16 178 466.5 filed Jul. 7, 2016, the entire disclosure of which is incorporated by reference herein.

TECHNICAL FIELD

The present disclosure relates to an arrangement for mounting aircraft components, in particular aircraft systems components, to aircraft seat rails.

BACKGROUND

Aircraft cabin or cargo areas typically include parallel seat rails which are primarily used for anchoring passenger seats. The seat rails are also used for anchoring medical beds for carrying injured passengers, particularly on military transport aircraft, or cargo. The seat rails typically have standard profiles corresponding to a universal standard, such as AS33601. Thus, seats, medical beds or other equipment can be easily interchanged in accordance with the use to which the aircraft is to be put.

SUMMARY

A first aspect of the disclosure herein provides an aircraft assembly comprising: first and second seat rails arranged to interlock with an aircraft seat; a mounting member having a first anchor member interlocked with the first seat rail and a second anchor member interlocked with the second seat rail, the mounting member having a first direction extending from the first anchor member to the second anchor member; and an aircraft systems component mounted on the mounting member.

In this way, the existing seat rails (also known as seat tracks) of the aircraft can be used for attachment of support brackets for aircraft systems components such as fuel pipes. Typically, systems components within an aircraft fuselage are mounted via systems brackets that are fastened to fuselage structure such as a frame or stringer. However, it is sometimes necessary to provide aircraft systems components in parts of the fuselage of an aircraft in which it is undesirable to modify the aircraft structure in order to attach such systems brackets. For example, systems components that are only provided in some variants of an aircraft type (e.g. a fuel tanker variant of a transport aircraft), or that are retrofitted after final assembly of the aircraft. The present inventors have developed a novel way of using existing seat rails to provide anchorage points for systems brackets for such systems components.

Aircraft systems components include all hardware (including wiring, pipes and other components) required for all of the various systems that contribute to operation of the aircraft. Examples of such systems include: fuel systems for transporting fuel between fuel tanks and the aircraft engines, a subset of which is fuel tanker systems which transport fuel between a fuel inlet (e.g. an in-flight refueling probe) and the fuel tanks; hydraulics for e.g. operation of flight control surfaces; electrical systems, flight control systems; bleed air systems; avionics; power plant; and ice protection systems. Thus, aircraft systems components are components that form part of an aircraft system that contributes to operation of the aircraft. Typically, aircraft systems include systems for transporting liquids (e.g. fuel or hydraulic fluid), gases (e.g. air) or electrical current (e.g. generated electricity or electrical signals). Examples of aircraft systems components suitable for use in the present disclosure include pipes or other conduits for carrying liquid (e.g. fuel or hydraulic fluid), gases (e.g. air), or electrical components (e.g. electrical wires).

The aircraft assembly preferably includes a second mounting member having a first anchor member interlocked with the first seat rail at a distance from the first anchor member of the mounting member, and a second anchor member interlocked with the second seat rail at a corresponding distance from the second anchor member of the mounting member, the aircraft systems component being mounted on the second mounting member so as to extend between the mounting member and the second mounting member. Thus, an aircraft systems component, such as a fuel pipe, cable, hydraulic pipe, or other elongate component, can be supported along its length by a plurality of mounting members, without modifying the aircraft structure.

The mounting member is preferably arranged such that movement of the first anchor member is substantially independent of movement of the second anchor member in at least one direction.

A second aspect of the disclosure herein provides an aircraft assembly comprising: first and second seat rails arranged to interlock with an aircraft seat; and a mounting member having a first anchor member interlocked with the first seat rail and a second anchor member interlocked with the second seat rail, the mounting member having a first direction extending from the first anchor member to the second anchor member, and the mounting member being arranged such that movement of the first anchor member is substantially independent of movement of the second anchor member in at least one direction.

The seat rails of an aircraft are designed to enable forces and moments applied by a passenger seat or medical bed interconnected with the seat rails to be transmitted to the fuselage structure of the aircraft, via the seat rails. However, the fuselage structure necessarily flexes and distorts during flight, e.g. as a result of aerodynamic loads on the aircraft, this distortion causing relative movement between seat rails. The present inventors have developed a mounting member in which relative movement between the seat rail connection parts (first and second anchor members) is independent in at least one direction, to prevent, or limit, any restriction of such relative movement between seat rails. The inventors have established that restriction of relative movement between seat rails is undesirable since it causes additional stresses and strains within the fuselage structure, which may cause failure of that structure.

The aircraft assembly preferably includes a second mounting member having a first anchor member interlocked with the first seat rail at a distance from the first anchor member of the mounting member, and a second anchor member interlocked with the second seat rail at a corresponding distance from the second anchor member of the mounting member, the aircraft component being mounted on the second mounting member so as to extend between the mounting member and the second mounting member.

The aircraft component may comprise any component housed within the aircraft, such as a passenger seat, medical bed or other item of equipment. Preferably, however, the aircraft component is an aircraft systems component, most preferably a fuel pipe of an aircraft fuel system. In embodiments in which the aircraft systems component comprises a fuel pipe, or other elongate systems component, the assembly may comprise a plurality of mounting members each supporting the fuel pipe at respective positions along its length.

The mounting member is preferably arranged to permit substantially independent relative movement between the first anchor member and the second anchor member in the first direction, a second direction orthogonal to the first direction, and a third direction orthogonal to the first and second directions. Thus, substantially all restriction of relative movement between the seat rails can be prevented.

The first anchor member may comprise a first joint arranged to prevent transmission of one or more moments from the mounting member to the first seat rail, the moments including: moments about the first direction, moments about a second direction orthogonal to the first direction, and moments about a third direction orthogonal to the first and second directions. In preferred embodiments the first joint is arranged to prevent transmission of moments about the first direction, moments about the second direction, and moments about the third direction from the mounting member to the first seat rail.

By preventing transmission of moments about the first direction, the mounting member does not restrict relative pivoting movement with respect to the first direction between the first and second seat rails. Similarly, by preventing transmission of moments about the second direction, the mounting member does not restrict relative pivoting movement with respect to the second direction between the first and second seat rails. Finally, preventing transmission of moments about the third direction, the mounting member does not restrict relative pivoting movement with respect to the third direction between the first and second seat rails.

To achieve the above functional requirements, the first joint may comprise a spherical bearing. A spherical bearing comprises a bearing that permits angular rotation (or pivoting) about a central point in three orthogonal directions. Spherical bearings can also be known as spherical plane bearings, spherical ball bushing bearings, or ball bushings, and typically comprise an inner ring with a convex outside surface and an outer ring with a correspondingly curved concave inside surface. The convex outside surface and concave inside surface are collectively considered the raceway, and slide against one another, optionally with the assistance of a lubricant, a liner (typically polytetrafluoroethylene or PTFE), or a rolling element such as a race of ball-bearings. Some spherical bearings may include a raceway comprising only one convex (toroidal) surface and one straight-sided (cylindrical) surface, the convex surface being arranged to roll relative to the straight-sided surface in order to achieve the necessary angular rotation in two of the three orthogonal directions.

The first joint may alternatively comprise any other type of joint that acts as a kinematic spherical joint having three degrees of freedom.

The second anchor member may comprise a second joint arranged to prevent transmission of one or more moments from the mounting member to the second seat rail, the moments including: moments about the first direction, moments about a second direction orthogonal to the first direction, and moments about a third direction orthogonal to the first and second directions. In preferred embodiments the second joint is arranged to prevent transmission of moments about the first direction, moments about the second direction, and moments about the third direction from the mounting member to the second seat rail.

Like the first joint, by preventing transmission of moments about the first direction, the mounting member does not restrict relative pivoting movement with respect to the first direction between the first and second seat rails. Similarly, by preventing transmission of moments about the second direction, the mounting member does not restrict relative pivoting movement with respect to the second direction between the first and second seat rails. Finally, preventing transmission of moments about the third direction, the mounting member does not restrict relative pivoting movement with respect to the third direction between the first and second seat rails.

Moreover, in embodiments in which the first and second joints are both arranged to prevent transmission of moments about the second and third directions, restriction of relative translational movement between the first and second seat rails is avoided. That is, by preventing transmission of moments about the second direction, the mounting member does not restrict relative translational movement between the first and second seat rails in the third direction. Similarly, by preventing transmission of moments about the third direction, the mounting member does not restrict relative translational movement between the first and second seat rails in the second direction.

To achieve the above functional requirements, like the first joint, the second joint may comprise a spherical bearing. The second joint may alternatively comprise any other type of joint that acts as a kinematic spherical joint having three degrees of freedom.

In preferred embodiments the second joint is arranged to prevent transmission of direct loads from the mounting member to the second seat rail in the first direction. In this way, relative translational movement between the first and second seat rails in the first direction is not restricted or constrained. To enable this, the second joint may be arranged to permit sliding in the first direction of the mounting member relative to the second seat rail. Preferably, the second joint comprises a pin arranged to slide within a spherical bearing.

In some embodiments the mounting member comprises a third anchor member interlocked with the first seat rail or the second seat rail, the third anchor member being arranged to transmit moments about the first direction from the mounting member to the first or second seat rail, respectively. Thus, the mounting member can be restrained from pivoting about the first direction.

In other embodiments the assembly includes a third seat rail and the mounting member includes a third anchor member interlocked with the third seat rail, the third anchor member being arranged to transmit movements about the first direction from the mounting member to the third seat rail.

A third aspect of the disclosure herein, related to the first aspect, provides a mounting member for supporting an aircraft systems component and for interlocking with first and second aircraft seat rails that are arranged to interlock with an aircraft seat, the mounting member comprising: a first anchor member adapted or configured to interlock with the first seat rail and a second anchor member adapted or configured to interlock with the second seat rail, wherein the mounting member has a first direction extending from the first anchor member to the second anchor member; and a systems connection portion adapted or configured to support an aircraft systems component mounted on the mounting member.

Movement of the first anchor member is preferably substantially independent of movement of the second anchor member in at least one direction.

Optional and desirable features of the disclosure herein can be applied to any aspect of the disclosure herein, either individually or in any combination. In particular, the features described above in relation to the first and second aspects can be applied to the third aspect.

BRIEF DESCRIPTION OF THE DRAWINGS

Embodiments of the disclosure herein will now be described with reference to the accompanying drawings, in which.

DETAILED DESCRIPTION

FIGS. 1 through 11 illustrate embodiments of a mounting member 100 according to the disclosure herein both interlocked with (FIGS. 1 through 7), and not interlocked with (FIGS. 8 through 11) first 210 and second 220 seat rails. The mounting member 100 is arranged to enable direct forces (i.e. direct loads, without a moment component) to be transmitted from the mounting member 100 to the first 210 or second 220 seat rails, without constraining the first and second seat rails. That is, the mounting member 100 is arranged to prevent the transmission of any direct forces or moments (torques) from the first seat rail 210 to the second seat rail 220, or vice versa.

Figure 1:
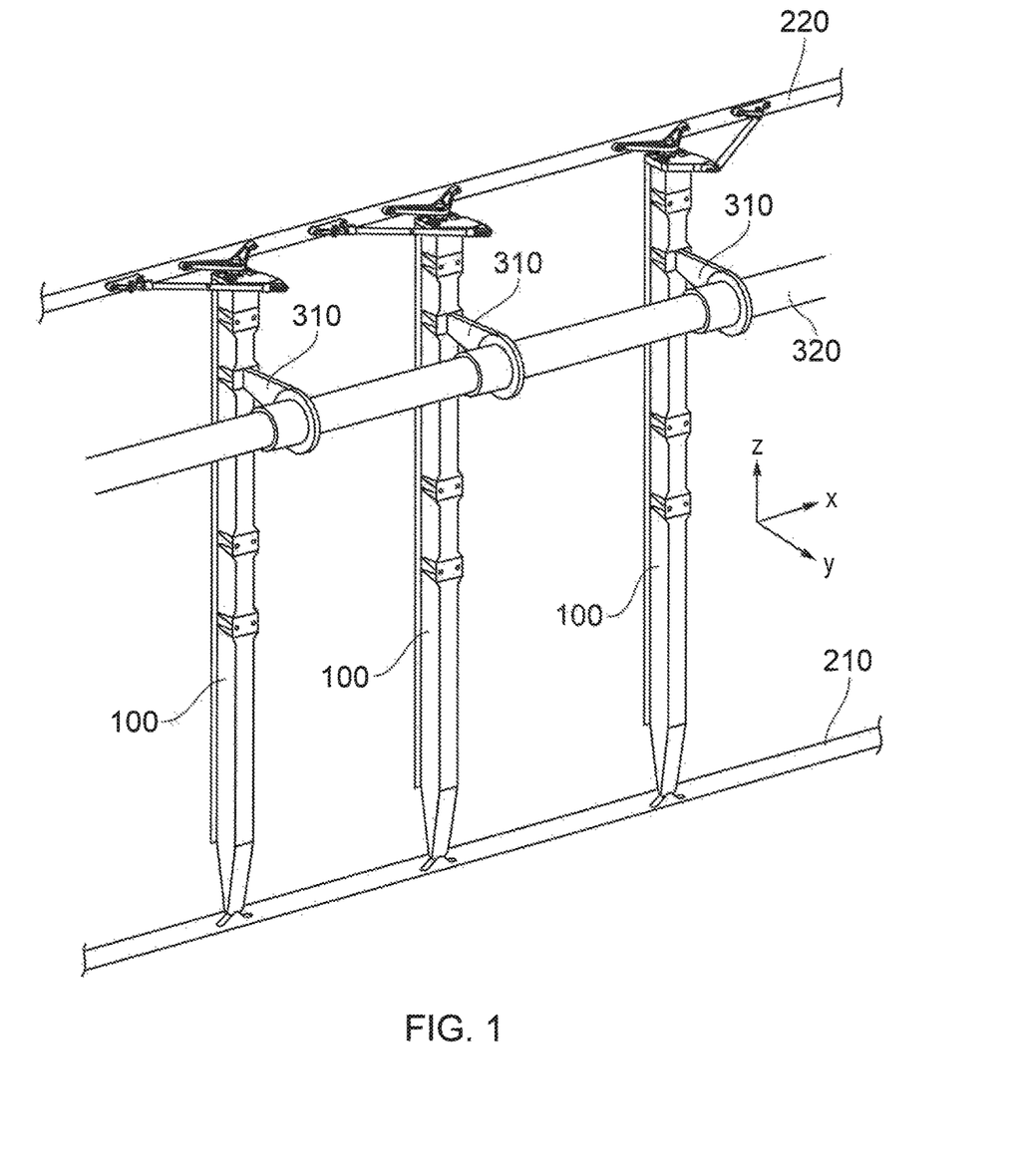
FIG. 1 shows a schematic view of a fuel system assembly according to an embodiment of the disclosure herein.
Figures 2, 3, 4:
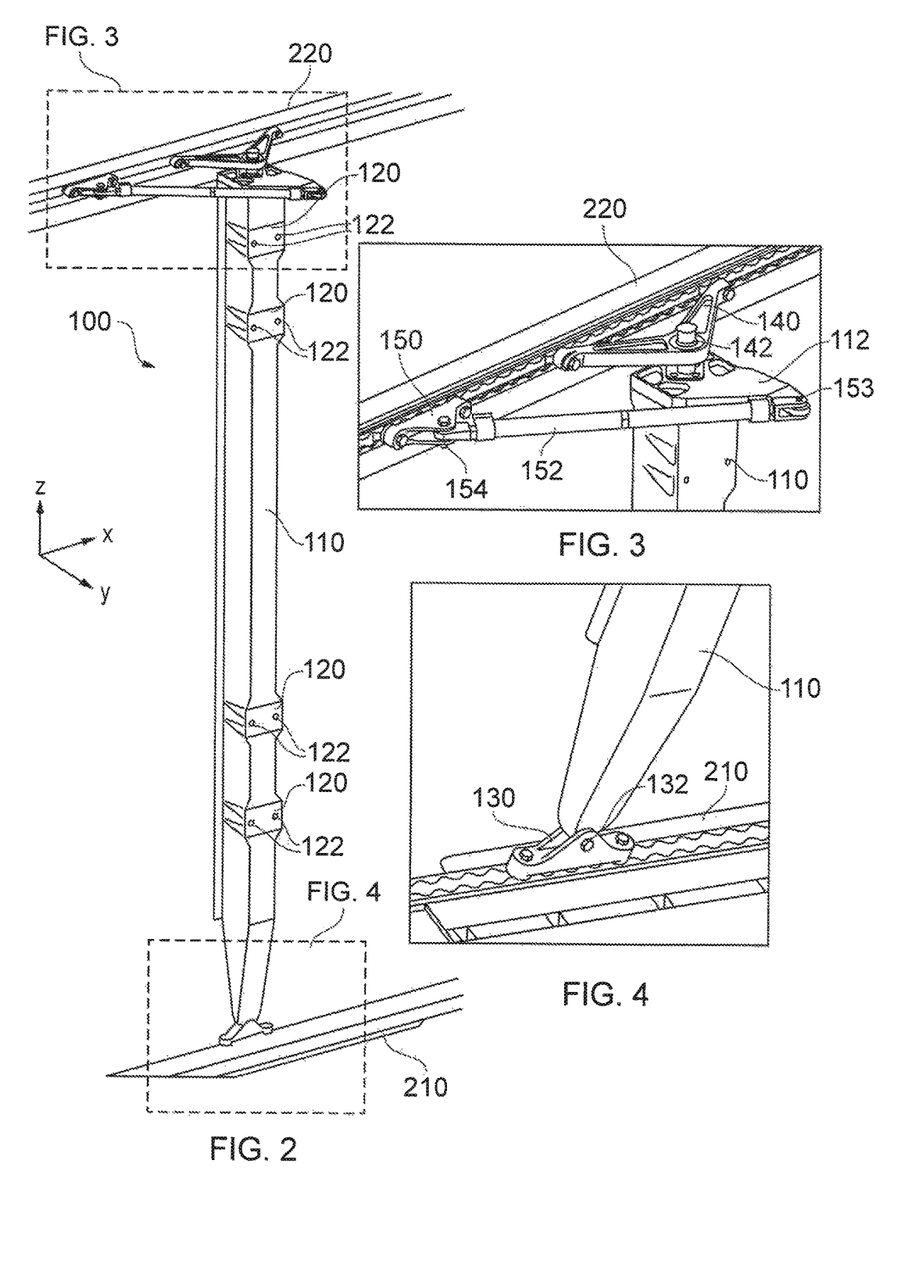
FIG. 2 shows an isometric view of a systems mounting member suitable for the embodiment of FIG. 1.
FIGS. 3 and 4 show detail views of FIG. 2.

The mounting member 100 includes a rigid elongate beam 110 which extends between the first 210 and second 220 seat rails in the z-direction that is substantially transverse to those seat rails (the first direction). The beam 110 comprises systems connection portions 120, each of which has fastener holes 122 through which a fuel systems bracket 310 is bolted (see FIG. 1). The fuel systems brackets 310 extend around a fuel pipe 320 so as to secure the fuel pipe 320 to the mounting member 100. Thus, a plurality of mounting members 100 arranged at spaced locations along the first 210 and second 220 seat rails together support the fuel pipe 320 (as shown in FIG. 1) so that direct loads and moments are exerted by the fuel pipe 320 on to the mounting members 110. The transmission of such direct loads and moments from the mounting members 110 to the first 210 and second 220 seat rails is controlled by the arrangement of the mounting member 100, as discussed below.

The mounting member 100 has a first anchor member 130 which is connected to a first end of the beam 110 and interlocked with the first seat rail 210, and a second anchor member 140 which is connected to a second end of the beam 110 and interlocked with the second seat rail 220. The mechanism for interlocking with the seat rails is in accordance with a standard connection principle, which will be described below.

Figures 5, 6, 7:
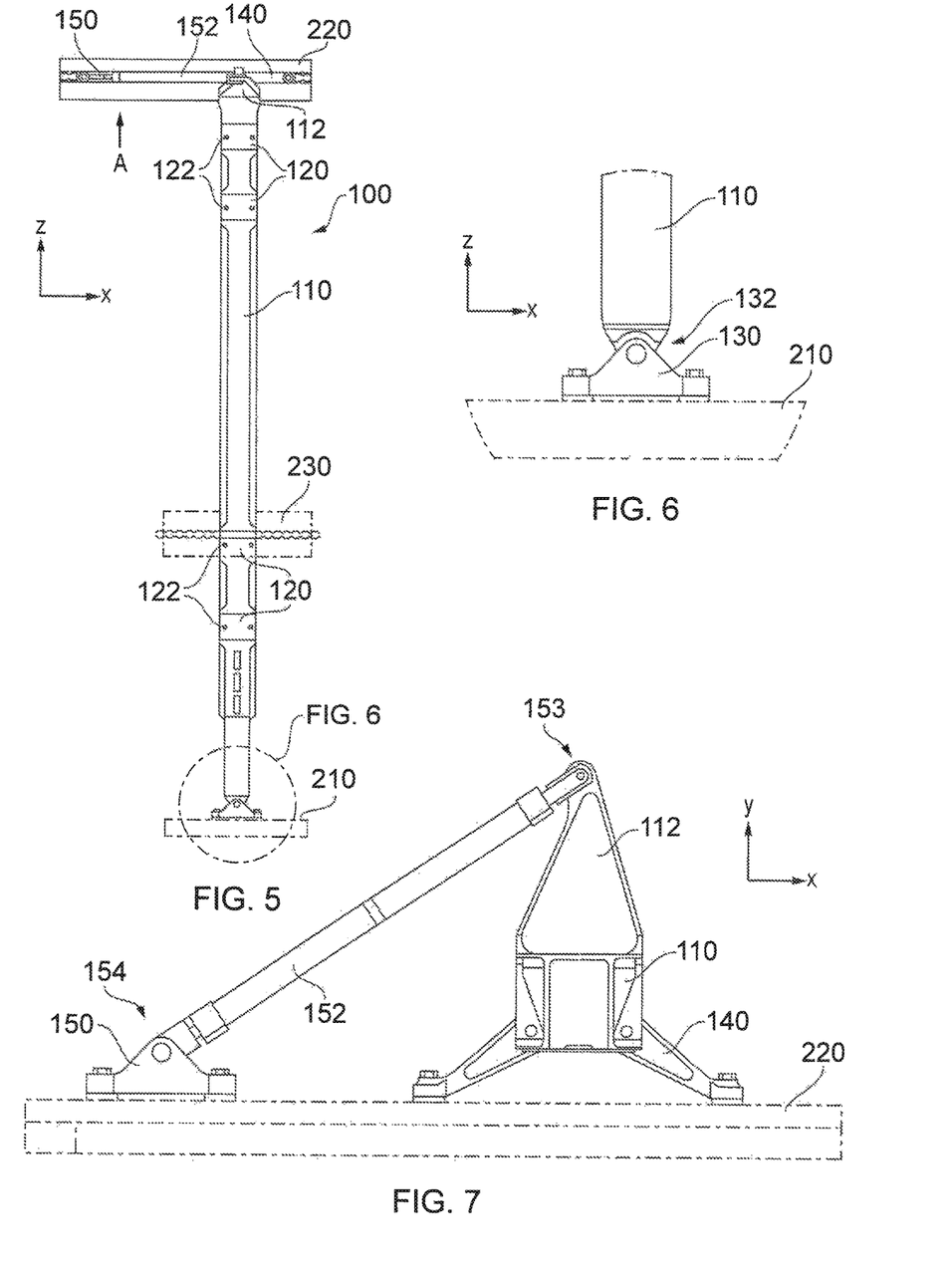
FIG. 5 shows a plan view of the systems mounting member of FIG. 2.
FIG. 6 shows a detail view of the first anchor member of FIG. 5.
FIG. 7 shows a detail side view (on arrow A) of the second and third anchor members of FIG. 5.
Figure 8:
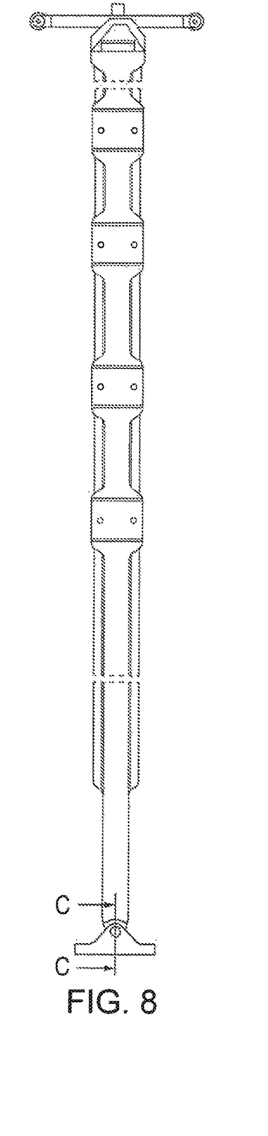
FIGS. 8 and 9 show a plan view and side view, respectively, of another systems mounting member suitable for the embodiment of FIG. 1, with the third anchor member omitted for clarity.
Figure 9:
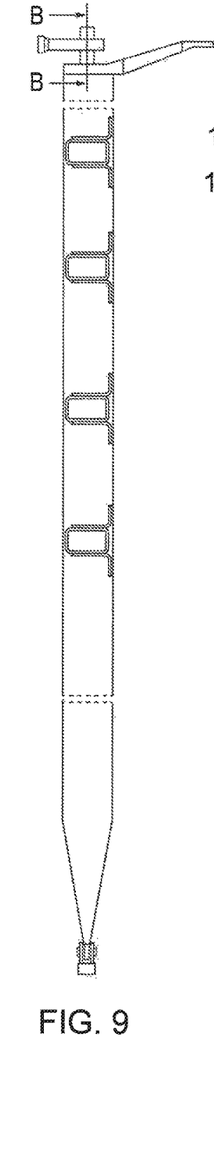
Figure 11:
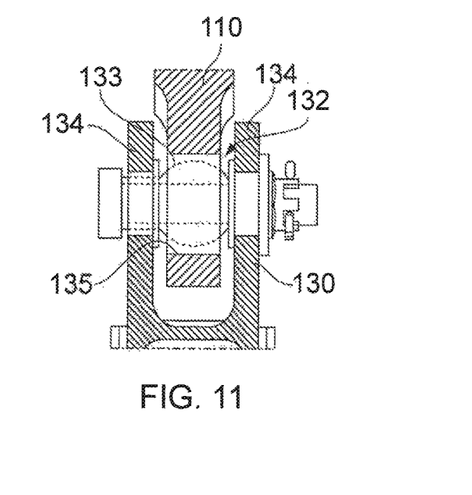

The connection between the first anchor member 130 and the beam 110 is via a spherical bearing 132 (best seen in FIGS. 6 and 11). In the illustrated embodiments the spherical bearing 132 comprises a pin 133 supported between a pair of lugs 134 of the first anchor member 130. The pin 133 has a central spherical (crowned, toroidal, or otherwise curved) portion which extends through a cylindrical aperture 135 of the first end of the beam 110. To achieve rotation about the x-direction, the contacting faces of the cylindrical aperture 135 and pin 133 slide against one another. To achieve rotation (or pivoting) about the y- or z-directions, the contacting faces move relative to one another via a rolling contact. In this way, the beam 110 is able to pivot to a limited degree relative to the first anchor member 130 about the x-direction, y-direction and z-direction.

The spherical bearing 132 thus permits direct forces in any direction to be transmitted from the fuel pipe 320 to the first seat rail 210, via the beam 110, but prevents the transmission of moments from the fuel pipe 320 to the first seat rail 210. The spherical bearing 132 may be replaced by any joint which achieves this function, or which at least prevents the transmission of all or some moments.

In other embodiments the spherical bearing 132 may have any other suitable arrangement, such as one in which the aperture 135 has a spherical (crowned, toroidal, or otherwise curved) profile and the pin 133 is cylindrical, or one in which both surfaces are spherical (crowned, toroidal, or otherwise curved) and are able to slide against one another in all three directions.

Figure 10:
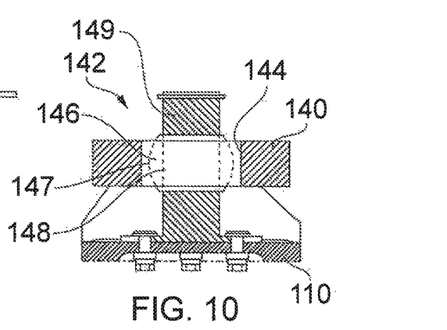
FIGS. 10 and 11 show detail sectional views of the joints indicated by the section lines B-B and C-C, respectively, in FIGS. 8 and 9.

The connection between the second anchor member 140 and the second seat rail 220 is via a sliding spherical bearing 142 (best seen in FIG. 10). The second anchor member 140 comprises a cylindrical aperture 144 through which extends an inner ring 146 which has a spherical (crowned, toroidal, or otherwise curved) outer face 147 and a cylindrical inner face that forms a bore hole 148. The inner ring 146 is retained within the aperture 144 in the z-direction (first direction). A cylindrical pin 149 extends from the second end of the beam 110 in the z-direction, the pin 149 passing through the bore hole 148 of the second anchor member 140 so that the pin is able to slide in the z-direction within the bore hole 148. To achieve rotation about the z-direction, the contacting faces of the bore hole 144 and pin 149 slide against one another. To achieve rotation (or pivoting) about the x- or y-directions, the contacting faces move relative to one another via a rolling contact. In this way, the beam 110 is able to pivot to a limited degree relative to the second anchor member 140 about the x-direction, y-direction and z-direction.

Thus, the slidable pin 149 of the sliding spherical bearing 142 prevents direct forces in the z-direction (first direction) from being transmitted from the fuel pipe 320 to the second seat rail 220, via the beam 110. The sliding spherical bearing 142 also prevents the transmission of moments from the fuel pipe 320 to the second seat rail, but permits the transmission of direct forces in the x-direction (second direction) and y-direction (third direction).

The sliding spherical bearing 142 may be replaced by any joint which achieves these functions, or which at least prevents the transmission of all moments or moments about the x- and y-directions. In other embodiments the sliding pin 149 may be replaced by any other joint in the second anchor member 140, first anchor member 130, or beam 110 that permits relative sliding in the z-direction between the first 130 and second 140 anchor members.

The mounting member 100 also includes a third anchor member 150 which interconnects the second seat rail 220 with the beam 110 via a tie rod 152. The third anchor member 150 is interlocked with the second seat rail 220 in accordance with a standard connection principle, as described below. The tie rod 152 comprises an elongate tension rod, one end of which is connected to a grow-out portion 112 that projects in the y-direction (third direction) from the second end of the beam 110 by a first pin joint 153. The other end of the tie rod 152 is connected to the third anchor member 150 by a second pin joint 154.

In this way, the tie rod 152 acts to prevent rotation of the beam 110 about the z-direction (first direction), by transmitting moments about the z-direction from the fuel pipe 320 to the second seat rail 220, via the beam 110 and the third anchor member 150.

In alternative embodiments the third anchor member 150 may be omitted, and rotation of the beam 110 about the z-direction may be prevented by a keyed, or splined, connection between the pin 149 and the bore hole 148 of the second anchor member 140, or by any other mechanism for preventing rotation of the pin 149 within the bore hole 148. Alternatively, the joint between the first and of the beam 110 and the first anchor member 130 may be modified to prevent pivoting of the beam 110 about the z-axis relative to the first anchor member 130. In a yet further embodiment, the third anchor member 150 may interlock with a third seat rail 230 (see FIG. 5). In such embodiments the tie rod 152 may be omitted, and the third anchor member 150 may be directly connected to the beam 110.

The above-described arrangement for the mounting member 100 avoids any constraint between the first 210 and second 220 seat rails. That is, movement of the first seat rail 210 relative to the second seat rail 220 cannot cause forces to be transmitted to the second seat rail 220 via the mounting member 110, and vice versa. The seat rails are constantly moving relative to one another during flight, as a result of changes in fuselage shape caused by aerodynamic loads amongst other things, and it is important to avoid preventing or restricting such relative movement in order to avoid inputting unwanted additional loads into the fuselage.

In detail, loads cannot be transmitted between the first 210 and second 220 seat rails for the following reasons:

Direct forces in the z-direction (first direction) cannot be transmitted because of the sliding spherical bearing 142 in which the pin 149 slides within the bore hole 148 of the second anchor member 140 in the z-direction.

Direct forces in the x- and y-directions (second and third directions, respectively) cannot be transmitted because of the spherical bearing 132 and sliding spherical bearing 142. For example, a direct force in the x-direction applied by the first seat rail 210 to the first anchor member 130 will result in a moment about the y-direction at the second anchor member 140, and the sliding spherical bearing 142 will prevent transmittal of that moment to the second seat rail 220. Similarly, a direct force in the y-direction applied by the second seat rail 210 to the second anchor member 140 will result in a moment about the x-direction at the first anchor member 130, and the spherical bearing 132 will prevent transmittal of that moment to the first seat rail.

Moments about the x- and y-directions (second and third directions, respectively) cannot be transmitted because the spherical bearing 132 and sliding spherical bearing 142 each prevent transmittal of such moments from the first 130 or second 140 anchor member, respectively, to the beam 110.

Moments about the z-direction (first direction) cannot be transmitted because the spherical bearing 132 prevents transmittal of such moments to the beam 110 from the first seat rail 210, via the first anchor member 130, or transmittal of such moments to the first anchor member 130 from the second seat rail 220, via the second anchor member 140 and beam 110.

In this way, the spherical bearing 132 and sliding spherical bearing 142 together prevent transmittal of direct forces and moments between the first 210 and second 22 seat rails.

Figure 12A:
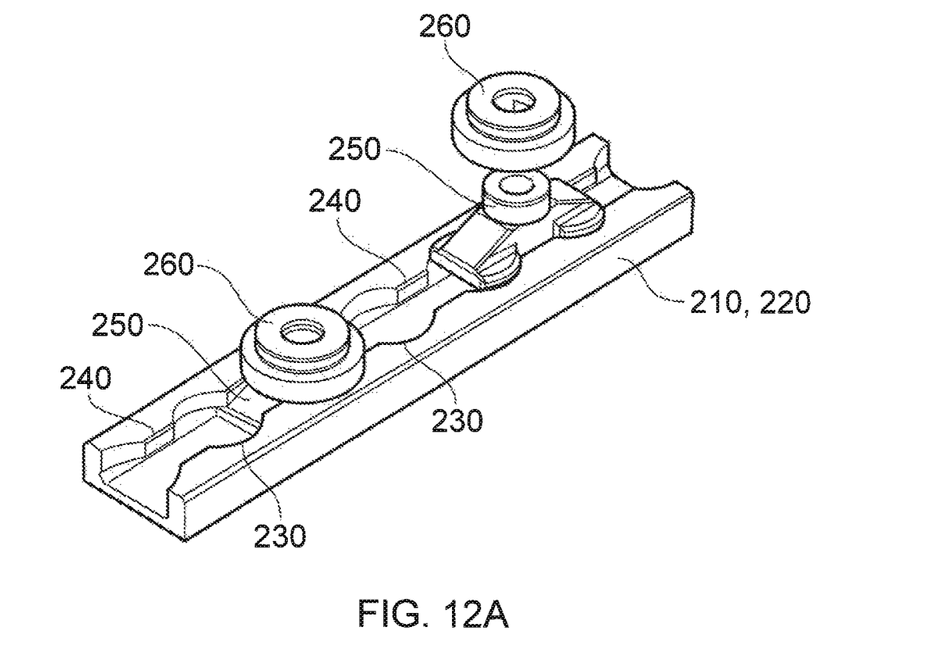
FIGS. 12A and 12B show isometric views of a standard seat rail and seat rail fitting.

As discussed above, the interlocking between the first 130, second 140 and third 150 anchor members and the first 210 or second 220 seat rails, respectively, is in accordance with a standard connection principle. The standard connection principle is controlled by universal standard AS33601, which controls the profile of seat rails used on aircraft, and standard ABS1262, which controls the profile of the interlocking parts. As shown in FIG. 12A, the first 210 and second 220 seat rails (made in accordance with AS33601) each comprise an elongate channel with opposing overhang portions, the overhang portions having mirrored profiles such that between them they define a repeating sequence of circular apertures 230 connected by narrower straight-sided apertures 240. Typically, the circular apertures 230 have a diameter of 19.94 mm and are spaced at a pitch of 25.4 mm between centers, while the straights-sided apertures 240 have a width of 11 mm.

Figure 12B:
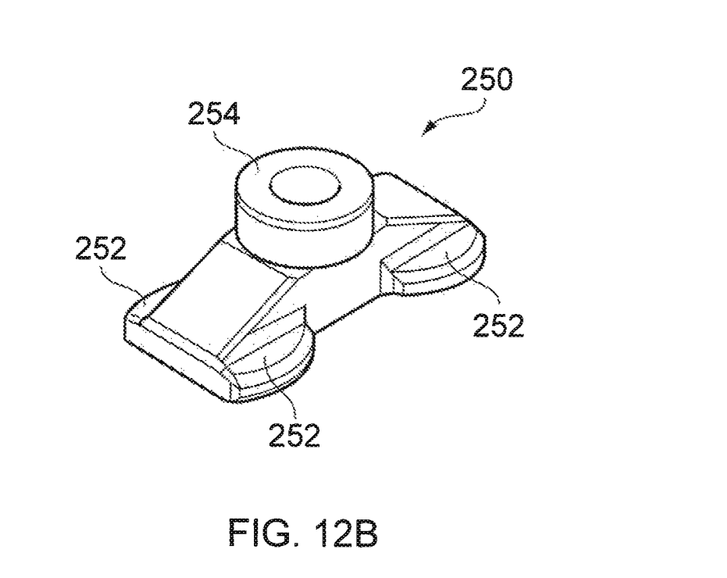

Standard seat rail fittings 250 (made in accordance with ABS1262) interlock with the first 210 and second 220 seat rails, as shown in FIGS. 12A and B. The fittings 250 each include a pair of anchor feet 252 which each comprise a truncated disc-shaped portion sized to be capable of passing through the circular aperture 230 of the rail, but not the straight-side aperture 240. The pair of feet 252 are spaced apart from one another by the same pitch as the circular apertures, so that the fitting 250 can be interlocked with the rail by insertion of the feet 252 into the channel via a neighboring pair of circular apertures 230 and subsequent translation within the channel to a position in which removal of the feet 252 is prevented by the straight-sided apertures 240. The right hand portion of FIG. 12A shows the fitting 250 during insertion, and the left hand portion shows the interlocked fitting 250 after insertion and translation.

Each fitting 250 has a fastening portion 254 to which the first 130, second 140 or third 150 anchor member is fastened in order to achieve interlocking between the respective anchor member and seat rail. A spacer 260 (see FIG. 12A) may be provided between the fastening portion 254 and the anchor member 130, 140, 150 in order to provide a clearance between the anchor member and the seat rail 210, 220.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft assembly comprising:
a first seat rail and a second seat rail arranged to interlock with an aircraft seat;
a mounting member comprising:
a first anchor member interlocked with the first seat rail, the first anchor member comprising a first joint arranged to prevent transmission of one or more moments from the mounting member to the first seat rail, the one or more moments comprising at least one moment about the first direction, at least one moment about a second direction orthogonal to the first direction, and at least one moment about a third direction orthogonal to the first and second directions;
a second anchor member interlocked with the second seat rail;
an elongate beam extending in the first direction from the first anchor member to the second anchor member; and
a systems connection portion mounted on an external surface of the elongate beam; and
an aircraft systems component attached external to, and spaced apart from, the elongate beam by the systems connection portion.

2. The aircraft assembly according to claim 1, comprising a second mounting member having a first anchor member interlocked with the first seat rail at a distance from the first anchor member of the mounting member, and a second anchor member interlocked with the second seat rail at a corresponding distance from the second anchor member of the mounting member, the aircraft systems component being mounted on the second mounting member to extend between the mounting member and the second mounting member.

3. The aircraft assembly according to claim 1, wherein the aircraft systems component comprises a pipe or conduit.

4. The aircraft assembly according to claim 1, wherein the aircraft systems component comprises a fuel pipe or fuel vent pipe of an aircraft fuel system.

5. The aircraft assembly according to claim 1, wherein the mounting member is arranged such that movement of the first anchor member is substantially independent of movement of the second anchor member in at least one of the first, second, and third directions.

6. The aircraft assembly according to claim 1, wherein the mounting member is arranged to permit substantially independent relative movement between the first anchor member and the second anchor member in the first direction, the second direction, and the third direction.

7. The aircraft assembly according to claim 1, wherein the first joint is arranged to prevent transmission, from the mounting member to the first seat rail, of moments about the first direction, moments about the second direction, and moments about the third direction.

8. The aircraft assembly according to claim 7, wherein the first joint comprises a spherical bearing.

9. The aircraft assembly according to claim 1, wherein the second anchor member comprises a second joint arranged to prevent transmission of one or more moments from the mounting member to the second seat rail, the one or more moments comprising at least one moment about the first direction, at least one moment about the second direction, and at least one moment about the third direction.

10. The aircraft assembly according to claim 9, wherein the second joint is arranged to prevent transmission, from the mounting member to the second seat rail, of moments about the second direction and moments about the third direction.

11. The aircraft assembly according to claim 10, wherein the second joint comprises a spherical bearing.

12. The aircraft assembly according to claim 9, wherein the second joint is arranged to prevent transmission of direct loads from the mounting member to the second seat rail in the first direction.

13. The aircraft assembly according to claim 12, wherein the second joint is arranged to permit sliding of the mounting member relative to the second seat rail in the first direction.

14. The aircraft assembly according to claim 1, wherein the mounting member comprises a third anchor member interlocked with the first seat rail or the second seat rail, the third anchor member being arranged to transmit moments about the first direction from the mounting member to the first or second seat rail, respectively.

15. The aircraft assembly according to claim 1, comprising a third seat rail arranged to interlock with an aircraft seat, wherein the mounting member comprises a third anchor member interlocked with the third seat rail, the third anchor member being arranged to transmit moments about the first direction from the mounting member to the third seat rail.

16. A mounting member for supporting an aircraft systems component and for interlocking with first and second aircraft seat rails, the mounting member comprising:
a first anchor member configured to interlock with the first seat rail, the first anchor member comprising a first joint configured to prevent transmission of one or more moments from the mounting member to the first seat rail, the one or more moments comprising at least one moment about the first direction, at least one moment about a second direction orthogonal to the first direction, and at least one moment about a third direction orthogonal to the first and second directions;
a second anchor member configured to interlock with the second seat rail;
an elongate beam extending in the first direction from the first anchor member to the second anchor member; and
a systems connection portion mounted on an external surface of the elongate beam to support the aircraft systems component at a position where the aircraft systems component is attached external to, and spaced apart from, the elongate beam by the systems connection portion.

17. The mounting member according to claim 16, wherein movement of the first anchor member is substantially independent of movement of the second anchor member in at least one of the first, second, and third directions.

18. The mounting member according to claim 16, comprising a third anchor member configured to interlock with a third seat rail and to transmit moments about the first direction from the mounting member to the third seat rail, wherein the third seat rail is configured to interlock with an aircraft seat.

19. A mounting member for supporting an aircraft systems component and for interlocking with first and second aircraft seat rails, the mounting member comprising:
a first anchor member interlocked with the first seat rail;
a second anchor member interlocked with the second seat rail; and a systems connection portion configured to support the aircraft systems component mounted on the mounting member;

wherein the mounting member has a first direction extending from the first anchor member to the second anchor member; and wherein the mounting member is arranged to permit substantially independent relative movement between the first anchor member and the second anchor member in the first direction, a second direction orthogonal to the first direction, and a third direction orthogonal to the first and second directions.

\* \* \* \* \*